United States Patent
Moore (10) Patent No.: US 8,266,672 B2
(45) Date of Patent: Sep. 11, 2012

(54) METHOD AND SYSTEM FOR NETWORK IDENTIFICATION VIA DNS

(75) Inventor: Howard Moore, Abingdon (GB)

(73) Assignee: Sophos PLC, Abingdon (GB)

( * ) Notice: Subject to any disclaimer, the term of this patent is extended or adjusted under 35 U.S.C. 154(b) by 912 days.

(21) Appl. No.: 12/053,112

(22) Filed: Mar. 21, 2008

(65) Prior Publication Data

US 2009/0241167 A1    Sep. 24, 2009

(51) Int. Cl.
*H04L 29/06* (2006.01)
(52) U.S. Cl. ........................................................ 726/1
(58) Field of Classification Search ........................ None
See application file for complete search history.

(56) References Cited

U.S. PATENT DOCUMENTS

| | | | |
|---|---|---|---|
| 6,845,400 B2 | 1/2005 | Macpherson et al. | |
| 6,961,783 B1* | 11/2005 | Cook et al. | 709/245 |
| 2005/0086340 A1 | 4/2005 | Kang et al. | |
| 2006/0143711 A1* | 6/2006 | Huang et al. | 726/23 |
| 2007/0073660 A1* | 3/2007 | Quinlan | 707/3 |
| 2007/0078996 A1* | 4/2007 | Chen et al. | 709/230 |
| 2007/0083670 A1* | 4/2007 | Kelley et al. | 709/245 |
| 2007/0260649 A1* | 11/2007 | Chakra et al. | 707/204 |
| 2008/0052758 A1* | 2/2008 | Byrnes | 726/1 |
| 2009/0070474 A1* | 3/2009 | Aura et al. | 709/228 |

FOREIGN PATENT DOCUMENTS

WO    WO0229584 A1    4/2002

* cited by examiner

*Primary Examiner* — David Pearson
(74) *Attorney, Agent, or Firm* — Strategic Patents, P.C.

(57) ABSTRACT

In embodiments of the present invention improved capabilities are described for accessing a DNS server, where the DNS server may be a DNS server within the control of a administrator. A pair of name and IP address may be stored on the DNS server. A client may then transmit the name to a DNS server to request the DNS server to lookup the IP address related to the client transmitted name. This client to DNS server communication may be performed as part of a network request from the client. The IP address may then be returned to the client in response to the connection request, which may allow the client to interpret the return of the security IP address as an indication of a known DNS server and therefore a known network. As a result, the client may then be able to set its security rules according to known network rules. Further, the identifying of a known network may be associated with location information associated with the DNS server, and thus the client, where the location information may be associated with multiple DNS IP address entries.

18 Claims, 4 Drawing Sheets

METHOD AND SYSTEM FOR NETWORK IDENTIFICATION VIA DNS

BACKGROUND

1. Field

The present invention is related to secure computing, and more specifically relating to network identification by a client.

2. Description of the Related Art

Users of mobile computing platforms may travel amongst a plurality of locations, where each location may have a unique set of malware threats. A user may employ an endpoint security facility on their mobile computing platform to help protect the client from such threats. However, if a user were to know they were on a network that could be trusted, they may be able to change some aspect related to malware protection, and thus improve the ease and security of their computing experience. Likewise, if a user where to know they were on a network that could not be trusted, they may increase some aspect related to malware protection, and thus reduce the threats from the untrusted network. There exists therefore a need for improved network identification as related to the security associated with the network.

SUMMARY

In embodiments of the present invention, a method and system may be provided for utilizing a domain name system (DNS) server to facilitate an identification of a network, where a client may connect to the network and establish the identification through communication with the DNS server. The client to DNS server communication may utilize standard DNS address protocols, where the client may make a DNS domain name request that may be associated with pre-defined, unique domain name IP address pairs stored on the DNS server. These unique domain name IP addresses may be previously recorded on the DNS server by an administrator associated with the invention, and may be associated with the identity of the DNS server, and thus, the network connected to the DNS server and the communicating client. In this way, the present invention may allow the administrator to configure the DNS servers within their control, that is, DNS servers internal to the administrator's network access control, to identify themselves to the client through an IP address returned to the client as a result of the client requesting at least one of the administer preconfigured domain names. Further, the unique domain name IP address pairs may not be assigned within the DNS, and so may not provide a requesting client a response when the client is not communicating with a DNS server within the control of the administrator of the invention. As a result, the client may be able to interpret the presence or absence of an IP address return from their unique domain name request as evidence of being currently connected to a known network, under the control of the administrator, and an unknown network, outside the control of the administrator. Further, there may be an administrator managed policy associated with a client connecting to a known network as opposed to an unknown network.

In embodiments, a DNS server may be accessed, where the DNS server is within the control of an administrator. A pair of name and IP address may be stored on the DNS server. A client may then transmit the name to a DNS server to request the DNS server to lookup the IP address related to the client transmitted name. This client to DNS server communication may be performed as part of a network request from the client. The IP address may be returned to the client in response to the connection request, which may allow the client to interpret the return of the IP address as an indication of a known DNS server and therefore a known network. As a result, the client may then be able to set its security rules according to known network rules according to an administrator managed policy. In embodiments, the name and IP address may not refer to a physical machine.

In embodiments, the DNS server may be configured by the administrator. Configuration may include a security IP name and security address pair assignment, where the security IP name and security address pair assignment may be associated with the identity of the DNS server, each DNS server may have a unique IP address, and the like. The security IP name and security address pair assignment may be associated with the location of the DNS server, related to networks associated with the DNS server and the client, related to networks associated with the DNS server and the client where there is a common network between the DNS server and the client, associated with a table of IP name and address pairs included in the DNS server, utilizes an IP loopback address, and the like. The DNS server may be connected to an external DNS server, where the external DNS server may not be within the control of the administrator, may contain records for public servers, may be a DNS server not within the control of the administrator, may be connected to the same network as the client, and the like, where the DNS server may be an DNS server within the control of the administrator, an external DNS server, and the like.

In embodiments, the administrator may be associated with an enterprise. The administrator may be associated with the configuration of enterprise computing devices, such as client, an endpoint client, where the client may be configured with a plurality of IP address and name pairs that may be related to the DNS server. The enterprise computing device may be a server, such as a DNS server, a DNS server configured with a plurality of IP address and name pairs, a DNS server, and the like. The at least one of the plurality of IP address and name pairs may be associated with the identity of the DNS server, with the location of the DNS server, and the like. The DNS server may be connected to the same network as the client. The administrator may be associated with a threat management facility, such as in association with security management, network access rules, policy management, and the like. Policy management may be associated with a security policy, such as in association with protection from malware. Policy management is associated with security rules, such as in association with the improvement of an enforcement of a policy. Policy management may be associated with the known network, such as when the known network is under the control of the administrator, when the known network is a trusted network, and the like. Policy management may be associated with an unknown network, such as when the unknown network may not be under the control of the administrator, when the unknown network is the Internet, when the unknown network is an untrusted network, and the like. In addition, policy management may be associated with security software, firewall configuration, with network connections, and the like.

In embodiments, the present invention may be associated with domain name and IP addresses that are secure. The name may be related to a policy within the control of the administrator, such as a security policy. The name may also be related to the policy. The name may include a globally unique name, including a globally unique identifier (GUID), a domain name, names that may be associated with a function of an associated secure IP address, names that may resolve into a single unique secure IP address, names that may not be available to hosts outside the known network and the like. The IP address may be a unique identifier related to the DNS server, where the unique identifier may be the same for each DNS server within the control of the administrator, different for each DNS server within the control of the administrator, and the like.

In embodiments, there may be communications between the client and the DNS server, such as the client transmitting a DNS request and the DNS server providing a reply back to the client. The client transmission to the DNS server may utilize the name previously stored in the client by the administrator, where the name may be a universal resource identifier (URI), a uniform resource locator (URL), address identifier, web address, and the like. The client may transmit the name to the DNS server associated with the each network connection related to the client. The client transmission may be associated with an A-type query, where the A-type query may be an address record that maps the name to the IP address. The name may be a hostname. The A-type query may be related to a 32-bit IPv4 address. The client transmission may be associated with an AAAA-type query, where AAAA-type query may be related to a 128-bit IPv6 address. The DNS server may be a DNS server, where the DNS server may return the IP address associated with its name to the client, and the IP address may be previously supplied to the DNS server by the administrator. The network request from the client may be the first communication session of the client with the network, such as with the network as the first time the client has used the network, the network as the beginning of a new network session, the network as the first network communication since the client powered on, and the like.

In embodiments, the client may interpret the message returned from the DSN server. The interpretation of the return may be associated with a known DNS server. The known DNS server may return an IP address to the client, the client may compare the returned IP address to the IP address stored on the client, the returned IP address may be a match to the IP address, the returned IP address may be from a known network, the security rules according to known network rules may include levels of access to the known network, where the access to the known network may be open access, restricted access, access associated with the current location of the client, access associated with the current location of the client when the current location of the client is different from the home location of the client, when the IP address stored on the client may be previously stored on the client by the administrator, and the like. The interpretation of the return may be associated with an unknown DNS server, where the unknown DNS server does not return an IP address to the client. The unknown DNS server may be associated with an unknown network, where the unknown network may not be within the control of the administrator. The unknown network may be the Internet. The unknown DNS server may return an error message to the client in response to the connection request. The error message may indicate that no available IP address matches the IP address. The unknown DNS server may return an IP address other than the IP address, where the IP address other than the IP address is associated with a help facility not in control of the administrator. This may cause the client to set its security rules according to unknown network rules, which may for example cause the client to disconnect from the unknown network, cause the client to restrict access to the unknown network, and the like.

In embodiments, identifying a known network may be associated with location information associated with the DNS server, and thus the client, where the location information may be associated with multiple DNS IP address entries. A plurality of DNS servers may be accessed, where the plurality of DNS servers may be DNS servers within the control of an administrator. A unique location specific IP address may be stored on each of the plurality of DNS servers, where all of the location specific IP addresses on the plurality of DNS servers may have the same name. In embodiments, a client may transmit the name to a DNS server to request the DNS server to lookup the IP address related to the client transmitted name at a network request from the client.

In embodiments, the location specific IP address may be returned to the client in response to the network request. The client may interpret the return of the location specific IP address as an indication of a known DNS server, and therefore a known network. The client may interpret the return of the location specific IP address to determine its location, and may cause the client to set its security rules according to known network rules for the given location according to an administrator managed policy. The unique location specific IP address may be related to the location of the internal point DNS server, where the unique location specific IP address may be different for each location of the internal point DNS server, different for each internal point DNS server, and the like. In embodiments, the location may be a country, a geographic region, a privately controlled location, a publicly controlled location, and the like, where the privately controlled location may be a business, a residence, and the like, and the publicly controlled location may be a government facility, a college, an open public space, or the like.

In embodiments, the DNS server may be a DNS server, within the control of a administrator. The policy may be a security policy, and the request made by the client may be an encrypted request and the DNS server decrypts the request, where the request made by the client may be made through a secured transaction. The client may use the IP address to access information pertaining to the known network, where the information pertaining to the known network may be information relating to the location of the known network, pertaining to the known network is a set of information, and the like.

BRIEF DESCRIPTION OF THE FIGURES

The invention and the following detailed description of certain embodiments thereof may be understood by reference to the following figures.

While the invention has been described in connection with certain preferred embodiments, other embodiments would be understood by one of ordinary skill in the art and are encompassed herein.

All documents referenced herein are hereby incorporated by reference.

DETAILED DESCRIPTION

An aspect of the present invention relates to corporate policy management and their implementation through a unified threat management facility 100. As will be explained in more detail below, a threat management facility 100 is used to protect computer assets from many threats, both computer generated threats and user generated threats. The threat management facility 100 is multi-dimensional in that it is designed to protect corporate assets from a variety of threats and it is adapted to learn about threats in one dimension (e.g. worm detection) and apply the knowledge in another dimension (e.g. spam detection). Corporate policy management is one of the dimensions for which the threat management facility can control. The corporation may institute a policy that prevents certain people (e.g. employees, groups of employees, types of employees, guest of the corporation, etc.) from accessing certain types of computer programs. For example, the corporation may elect to prevent its accounting department from using a particular version of an instant messaging service or all such services. In this example, the policy management facility 112 may be used to update the policies of all corporate computing assets with a proper policy control facility or it may update a select few. By using the threat management facility 100 to facilitate the setting, updating and control of such policies the corporation only needs to be concerned with keeping the threat management facility 100 up to date on such policies. The threat management facility 100 can take care of updating all of the other corporate computing assets.

It should be understood that the threat management facility 100 may provide multiple services and policy management may be offered as one of the services. We will now turn to a description of the threat management system 100.

Over recent years, malware has become a major problem across the internet 154. From both technical and user perspectives the categorization of a specific threat type, such as whether it is a virus, worm, spam, phishing exploration, spyware, adware, or the like, is becoming reduced in significance. The threat, no matter how it's categorized, may need to be stopped at all points of the enterprise facility 102, including laptop, desktop, server facility 142, gateway, and the like. Similarly, there may be less and less benefit to the user in having different solutions for known and unknown threats. As such, a consolidated threat management facility 100 may need to be applied to the same set of technologies and capabilities for all threats. The threat management facility 100 may provide a single agent on the desktop, and a single scan of any suspect file. This approach may eliminate the inevitable overlaps and gaps in protection caused by treating viruses and spyware as separate problems, while simultaneously simplifying administration and minimizing desktop load. As the number and range of types of threats has increased, so may have the level of connectivity available to all IT users. This may have lead to a rapid increase in the speed at which threats may move. Today, an unprotected PC connected to the internet 154 may be infected quickly, say within 10 minutes, which may require acceleration for the delivery of threat protection. Where once, monthly updates may have been sufficient, the threat management facility 100 may automatically and seamlessly update its product set against spam and virus threats quickly, for instance, every five minutes, every minute, continuously, or the like. Analysis and testing may be increasingly automated, and also may be performed more frequently; for instance, it may be completed in 15 minutes, and may do so without compromising quality. The threat management facility 100 may also extend techniques that may have been developed for virus and malware protection, and provide them to enterprise facility 102 network administrators to better control their environments. In addition to stopping malicious code, the threat management facility 100 may provide policy management that may be able to control legitimate applications, such as VoIP, instant messaging, peer-to-peer file-sharing, and the like, that may undermine productivity and network performance within the enterprise facility 102.

The threat management facility 100 may provide an enterprise facility 102 protection from computer-based malware, including viruses, spyware, adware, Trojans, intrusion, spam, policy abuse, uncontrolled access, and the like, where the enterprise facility 102 may be any entity with a networked computer-based infrastructure. In an embodiment, FIG. 1 may depict a block diagram of the threat management facility providing protection to an enterprise against a plurality of threats. The enterprise facility 102 may be corporate, commercial, educational, governmental, or the like, and the enterprise facility's 102 computer network may be distributed amongst a plurality of facilities, and in a plurality of geographical locations. The threat management facility 100 may include a plurality of functions, such as security management facility 122, policy management facility 112, update facility 120, definitions facility 114, network access rules facility 124, remedial action facility 128, detection techniques facility 130, testing facility 118, threat research facility 132, and the like. In embodiments, the threat protection provided by the threat management facility 100 may extend beyond the network boundaries of the enterprise facility 102 to include enterprise facility 102 client facility's 144 that have moved into network connectivity not directly associated or controlled by the enterprise facility 102. Threats to enterprise facility 102 client facilities 144 may come from a plurality of sources, such as from network threats 104, physical proximity threats 110, secondary location threats 108, and the like. In embodiments, the threat management facility 100 may provide an enterprise facility 102 protection from a plurality of threats to multiplatform computer resources in a plurality of locations and network configurations, with an integrated system approach.

In embodiments, the threat management facility 100 may be provided as a stand-alone solution. In other embodiments, the threat management facility 100 may be integrated into a third-party product. An application programming interface (e.g. a source code interface) may be provided such that the threat management facility 100 may be integrated. For instance, the threat management facility 100 may be stand-alone in that it provides direct threat protection to an enterprise or computer resource, where protection is subscribed to directly with the threat management facility 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may include a plurality of elements that provide protection from malware to enterprise facility 102 computer resources, including endpoint security and control, email security and control, web security and control, control of unauthorized users, control of guest and non-compliant computers, and the like. The security management facility 122 may be a software application that may provide malicious code and malicious application protection to a client facility 144 computing resource. The security management facility 122 may have the ability to scan the client facility 144 files for malicious code, remove or quarantine certain applications and files, prevent certain actions, perform remedial actions and perform other security measures. In embodiments, scanning the client facility 144 may include scanning some or all of the files stored to the client facility 144 on a periodic basis, may scan applications once the application has been requested to execute, may scan files as the files are transmitted to or from the client facility 144, or the like. The scanning of the applications and files may be to detect known malicious code or known unwanted applications. In an embodiment, new malicious code and unwanted applications may be continually developed and distributed, and updates to the known code database may be provided on a periodic basis, on a demand basis, on an alert basis, or the like.

In an embodiment, the security management facility 122 may provide for email security and control, where security management may help to eliminate spam, viruses, spyware and phishing, control of email content, and the like. The security management facilities 122 email security and control may protect against inbound and outbound threats, protect email infrastructure, prevent data leakage, provide spam filtering, and the like. In an embodiment, security management facility 122 may provide for web security and control, where security management may help to detect or block viruses, spyware, malware, unwanted applications, help control web browsing, and the like, which may provide comprehensive web access control enabling safe, productive web browsing. Web security and control may provide internet use policies, reporting on suspect devices, security and content filtering, active monitoring of network traffic, URI filtering, and the like. In an embodiment, the security management facility 122 may provide for network access control, which may provide control over network connections. Network control may stop unauthorized, guest, or non-compliant systems from accessing networks, and may control network traffic that may not be bypassed from the client level. In addition, network access control may control access to virtual private networks (VPN), where VPNs may be a communications network tunneled through another network, establishing a logical connection acting as a virtual network. In embodiments, a VPN may be treated in the same manner as a physical network.

In an embodiment, the security management facility 122 may provide for host intrusion prevention through behavioral based protection, which may guard against unknown threats by analyzing behavior before software code executes. Behavioral based protection may monitor code when it runs and intervene if the code is deemed to be suspicious or malicious. Advantages of behavioral based protection over runtime protection may include code being prevented from running, whereas runtime protection may only interrupt code that has already partly executed; behavioral protection may identify malicious code at the gateway or on the file servers and deletes it before reaching end-point computers; and the like.

In an embodiment, the security management facility 122 may provide for reputation filtering, which may target or identify sources of known malware. For instance, reputation filtering may include lists of URIs of known sources of malware or known suspicious IP addresses, or domains, say for spam, that when detected may invoke an action by the threat management facility 100, such as dropping them immediately. By dropping the source before any interaction can initiate, potential threat sources may be thwarted before any exchange of data can be made.

In embodiments, information may be sent from the enterprise back to a third party, a vendor, or the like, which may lead to improved performance of the threat management facility 100. For example, the types, times, and number of virus interactions that a client experiences may provide useful information for the preventions of future virus threats. This type of feedback may be useful for any aspect of threat detection. Feedback of information may also be associated with behaviors of individuals within the enterprise, such as being associated with most common violations of policy, network access, unauthorized application loading, unauthorized external device use, and the like. In embodiments, this type of information feedback may enable the evaluation or profiling of client actions that are violations of policy that may provide a predictive model for the improvement of enterprise policies.

In an embodiment, the security management facility 122 may provide for the overall security of the enterprise facility 102 network or set of enterprise facility 102 networks, may provide updates of malicious code information to the enterprise facility 102 network, and associated client facilities 144. The updates may be a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without an administration facility's 134 direct control, manually transmitted by the administration facility 134, or the like. The security management facility 122 may include the management of receiving malicious code descriptions from a provider, distribution of malicious code descriptions to enterprise facility 102 networks, distribution of malicious code descriptions to client facilities 144, or the like. In an embodiment, the management of malicious code information may be provided to the enterprise facility's 102 network, where the enterprise facility's 102 network may provide the malicious code information through the enterprise facility's 102 network distribution system.

The threat management facility 100 may provide policy management facility 112 that may be able to block non-malicious applications, such as VoIP 164, instant messaging 162, peer-to-peer file-sharing, and the like, that may undermine productivity and network performance within the enterprise facility 102. The policy management facility 112 may be a set of rules or policies that may indicate enterprise facility 102 access permissions for the client facility 144, such as access permissions associated with the network, applications, external computer devices, and the like. The policy management facility 112 may include a database, a text file, a combination of databases and text files, or the like. In an embodiment, a policy database may be a block list, a black list, an allowed list, a white list, or the like that may provide a list of enterprise facility 102 external network locations/applications that may or may not be accessed by the client facility 144. The policy management facility 112 may include rules that may be interpreted with respect to an enterprise facility 102 network access request to determine if the request should be allowed. The rules may provide a generic rule for the type of access that may be granted; the rules may be related to the policies of an enterprise facility 102 for access rights for the enterprise facility's 102 client facility 144. For example, there may be a rule that does not permit access to sporting websites. When a website is requested by the client facility 144, a security facility may access the rules within a policy facility to determine if the requested access is related to a sporting website. In an embodiment, the security facility may analyze the requested website to determine if the website matches with any of the policy facility rules.

The policy management facility 112 may be similar to the security management facility 122 but with the distribution of enterprise facility 102 wide access rules and policies that may maintain control of the access of client facility 144 to enterprise facility 102 network resources. The policies may be defined for application type, subset of application capabilities, organization hierarchy, computer facility type, user type, network location, time of day, connection type, or the like. Policies may be maintained by the administration facility 134, through the threat management facility 100, in association with a third party, or the like. For example, a policy may restrict IM 162 activity to only support personnel for communicating with customers. This may allow communication for departments requiring access, but may maintain the network bandwidth for other activities by restricting the use of IM 162 to only the personnel that need access to IM 162 in support of the enterprise facility 102. In an embodiment, the policy management facility 112 may be a standalone application, may be part of the policy management facility 112 network server facility 142, may be part of the enterprise facility 102 network, may be part of the client facility 144, or the like.

In embodiments, the threat management facility 100 may provide configuration management, which may be similar to policy management, but may specifically examine the configuration set of applications, operating systems, hardware, and the like, and managing changes to their configurations. Assessment of a configuration may be made against a standard configuration policy, detection of configuration changes, remediation of improper configuration, application of new configurations, and the like. An enterprise may keep a set of standard configuration rules and policies which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

In embodiments, the threat management facility 100 may also provide for the removal of applications that may interfere with the operation of the threat management facility 100, such as competitor products that may also be attempting similar threat management functions. The removal of such products may be initiated automatically whenever such products are detected. In the case where such applications are services are provided indirectly through a third-party product, the application may be suspended until action is taken to remove or disable the third-party product's protection facility.

Threat management against a sometimes quickly evolving malware environment may require timely updates, and the update management facility 120 may be provided by the threat management facility 100 enterprise facility 102. In addition, a policy management facility 112 may also require update management (e.g. as provided by the update facility 120 herein described), as the enterprise facility 102 requirements for policies change enterprise facility 102 server facility 142 enterprise facility 102 client facility 144 server facility 142 enterprise facility 102. The update management for the security facility 122 and policy management facility 112 may be provided directly by the threat management facility 100, such as by a hosted system or in conjunction with the administration facility 134. In embodiments, the threat management facility 100 may provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or client facility 144, the enterprise facility 102 network and/or client facility 144 may pull information from the security facility 122 and policy management facility 112 network server facilities 142, there may be a combination of pushing and pulling of information between the security facility 122 and the policy management facility 112 network servers 142, enterprise facility 102 network, and client facilities 144, or the like. For example, the enterprise facility 102 network and/or client facility 144 may pull information from the security facility 122 and policy management facility 112 network server facility 142 may request the information using the security facility 122 and policy management facility 112 update module; the request may be based on a certain time period, by a certain time, by a date, on demand, or the like. In another example, the security facility 122 and policy management facility 112 network servers 142 may push the information to the enterprise facility's 102 network and/or client facility 144 by providing notification that there are updates available for download and then transmitting the information. The combination of the security management 122 network server facility 142 and security update module may function substantially the same as the policy management facility 112 network server and policy update module by providing information to the enterprise facility 102 network and the client facility 144 in a push or pull method. In an embodiment, the policy management facility 112 and the security facility 122 management update modules may work in concert to provide all the needed information to the enterprise facility's 102 network and/or client facility 144 for control of application execution. In an embodiment, the policy update module and security update module may be combined into a single update module.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The IDE definition files may provide information that may identify malicious code within files, applications, or the like. The definition files may be accessed by security management facility 122 when scanning files or applications within the client facility 144 for the determination of malicious code that may be within the file or application. The definition files may contain a number of commands, definitions, or instructions, to be parsed and acted upon, or the like. In embodiments, the client facility 144 may be updated with new definition files periodically to provide the client facility 144 with the most recent malicious code definitions; the updating may be performed on a set time period, may be updated on demand from the client facility 144, may be updated on demand from the network, may be updated on a received malicious code alert, or the like. In an embodiment, the client facility 144 may request an update to the definition files from an update facility 120 within the network, may request updated definition files from a computing facility external to the network, updated definition files may be provided to the client facility 114 from within the network, definition files may be provided to the client facility 144 from an external computing facility from an external network, or the like.

In an embodiment, a definition management facility 114 may provide for the timely updates of definition files information to the network, client facilities 144, and the like. New and altered malicious code and malicious applications may be continually created and distributed to networks worldwide. The definition files that maintain the definitions of the malicious code and malicious application information for the protection of the networks and client facilities 144 may need continual updating to provide continual defense of the network and client facility 144 from the malicious code and malicious applications. The definition files management may provide for automatic and manual methods of updating the definition files. In embodiments, the network may receive definition files and distribute the definition files to the network client facilities 144, the client facilities 144 may receive the definition files directly, or the network and client facilities 144 may both receive the definition files, or the like. In an embodiment, the definition files may be updated on a fixed periodic basis, on demand by the network and/or the client facility 144, as a result of an alert of a new malicious code or malicious application, or the like. In an embodiment, the definition files may be released as a supplemental file to an existing definition files to provide for rapid updating of the definition files.

In a similar manner, the security management facility 122 may be used to scan an outgoing file and verify that the outgoing file is permitted to be transmitted per the enterprise facility 102 rules and policies. By checking outgoing files, the security management facility 122 may be able discover malicious code infected files that were not detected as incoming files as a result of the client facility 144 having been updated with either new definition files or policy management facility 112 information. The definition files may discover the malicious code infected file by having received updates of developing malicious code from the administration facility 134, updates from a definition files provider, or the like. The policy management facility 112 may discover the malicious code infected file by having received new updates from the administration facility 134, from a rules provider, or the like.

The threat management facility 100 may provide for a way to control access to the enterprise facility 102 networks. For instance, the enterprise facility 102 may want to restrict access to certain applications, networks, files, printers, servers, databases, or the like. In addition, the enterprise facility 102 may want to restrict user access under certain conditions, such as the user's location, usage history, need to know, job position, connection type, time of day, method of authentication, client-system configuration, or the like. Network access rules may be developed by the enterprise facility 102, or pre-packaged by a supplier, and managed by the threat management facility 100 in conjunction with the administration facility 134. Network access rules and control may be responsible for determining if a client facility 144 application should be granted access to a requested network location. The network location may be on the same network as the facility or may be on another network. In an embodiment, the network access control may verify access rights for client facilities 144 from within the network or may verify access rights of computer facilities from external networks. When network access for a client facility 144 is denied, the network access control may send an information file to the client facility 144, the information file may contain data or commands that may provide instructions for the remedial action facility 128. The information sent by the network access facility 124 control may be a data file. The data file may contain a number of commands, definitions, instructions, or commands to be parsed and acted upon through the remedial action facility 128, or the like. The information sent by the network access facility 124 control may be a command or command file that the remedial action facility 128 may access and take action upon.

In an embodiment, the network access rules 124 may provide an information store to be accessed by the network access control. The network access rules facility 124 may include databases such as a block list, a black list, an allowed list, a white list, an unacceptable network site database, an acceptable network site database, a network site reputation database, or the like of network access locations that may or may not be accessed by the client facility 144. Additionally, the network access rules facility 124 may incorporate rule evaluation; the rule evaluation may parse network access requests and apply the parsed information to network access rules. The network access rule facility 124 may have a generic set of rules that may be in support of an enterprise facility's 102 network access policies, such as denying access to certain types of websites 158, controlling instant messenger 162 accesses, or the like. Rule evaluation may include regular expression rule evaluation, or other rule evaluation method for interpreting the network access request and comparing the interpretation to the established rules for network access. In an embodiment, the network access rules facility 124 may receive a rules evaluation request from the network access control and may return the rules evaluation to the network access control.

Similar to the threat definitions facility 114, the network access rule facility 124 may provide updated rules and policies to the network access rules facility 124. The network access rules facility 124 may be maintained by the network administration facility 134 using the network access rules facility 124 management. In an embodiment, the network administration facility 134 may be able to maintain a set of access rules manually by adding rules, changing rules, deleting rules, or the like. Additionally, the administration facility 134 may be able to retrieve predefined rule sets from a provider that may provide a set of rules to be applied to an entire enterprise facility 102. The network administration facility 134 may be able to modify the predefined rules as needed for a particular enterprise facility 102 using the network access rules facility 124 management.

When a threat or policy violation is detected by the threat management facility 100, the threat management facility 100 may provide for a remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, record interactions for subsequent evaluation, or the like. Remedial action may be associated with an application that responds to information that a client facility 144 network access request has been denied. In an embodiment, when the data file is received, remedial action may parse the data file, interpret the various aspects of the data file, and act on the parsed data file information to determine actions to be taken on an application requesting access to a denied network location. In an embodiment, when the data file is received, remedial action may access the threat definitions to parse the data file and determine an action to be taken on an application requesting access to a denied network location. In an embodiment, the information received from the facility may be a command or a command file. The remedial action facility may carry out any commands that are received or parsed from a data file from the facility without performing any interpretation of the commands. In an embodiment, the remedial action facility may interact with the received information and may perform various actions on a client requesting access to a denied network location. The action may be one or more of continuing to block all requests to a denied network location, a malicious code scan on the application, a malicious code scan on the client facility 144, quarantine of the application, terminating the application, isolation of the application, isolation of the client facility 144 to a location within the network that restricts network access, blocking a network access port from a client facility 144, reporting the application to a administration facility 134, or the like.

Remedial action may be provided as a result of a detection of a threat or violation. The detection techniques facility 130 may include monitoring the enterprise facility 102 network or end-point devices, such as by monitoring streaming data through the gateway, across the network, through routers and hubs, and the like. The detection techniques facility 130 may include monitoring activity and stored files on computing facilities, such as on server facilities 142, desktop computers, laptop computers, other mobile computing devices, and the like. Detection techniques, such as scanning a computer's stored files, may provide the capability of checking files for stored threats, either in the active or passive state. Detection techniques, such as streaming file management, may provide the capability of checking files received at the network, gateway facility, client facility 144, and the like. This may provide the capability of not allowing a streaming file or portions of the streaming file containing malicious code from entering the client facility 144, gateway facility, or network. In an embodiment, the streaming file may be broken into blocks of information, and a plurality of virus identities may be used to check each of the blocks of information for malicious code. In an embodiment, any blocks that are not determined to be clear of malicious code may not be delivered to the client facility 144, gateway facility, or network.

Verifying that the threat management facility 100 is detecting threats and violations to established policy, may require the ability to test the system, either at the system level or for a particular computing component. The testing facility 118 may allow the administration facility 134 to coordinate the testing of the security configurations of client facility 144 computing facilities on a network. The administration facility 134 may be able to send test files to a set of client facility 144 computing facilities to test the ability of the client facility 144 to determine acceptability of the test file. After the test file has been transmitted, a recording facility may record the actions taken by the client facility 144 in reaction to the test file. The recording facility may aggregate the testing information from the client facility 144 and report the testing information to the administration facility 134. The administration facility 134 may be able to determine the level of preparedness of the client facility 144 computing facilities by the reported information. Remedial action may be taken for any of the client facility 144 computing facilities as determined by the administration facility 134; remedial action may be taken by the administration facility 134 or by the user of the client facility 144.

The threat research facility 132 may provide a continuously ongoing effort to maintain the threat protection capabilities of the threat management facility 100 in light of continuous generation of new or evolved forms of malware. Threat research may include researchers and analysts working on known and emerging malware, such as viruses, rootkits a spyware, as well as other computer threats such as phishing, spam, scams, and the like. In embodiments, through threat research, the threat management facility 100 may be able to provide swift, global responses to the latest threats.

Figure 1:
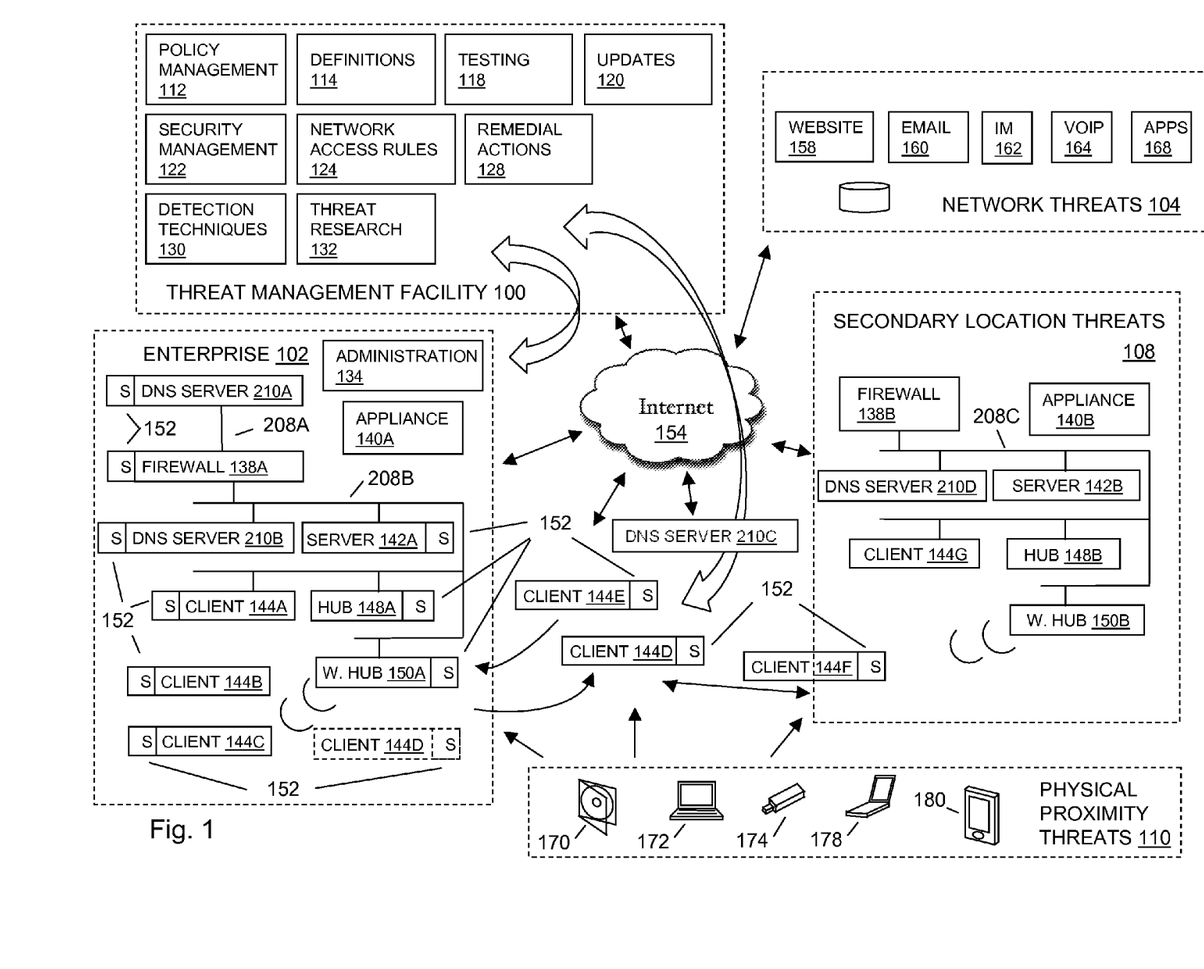
FIG. 1 depicts a block diagram of the threat management facility providing protection to an enterprise against a plurality of threats.

The threat management facility 100 may provide threat protection to the enterprise facility 102, where the enterprise facility 102 may include a plurality of networked components, such as client facility 144, server facility 142, DNS server facility 210, administration facility 134, firewall 138, gateway, hubs 148, routers, threat management appliance 140, desktop users, mobile users, and the like. In embodiments, it may be the end-point computer security facility 152, located on a computer's desktop, which may provide threat protection to a user, and associated enterprise facility 102. In embodiments, the term end-point may refer to a computer system that may source data, receive data, evaluate data, buffer data, or the like, such as a user's desktop computer as an end-point computer, a firewall as a data evaluation end-point computer system, a laptop as a mobile end-point computer, a PDA as a hand-held end-point computer. In embodiments, end-point may refer to a source or destination for data, including such components where the destination is characterized by an evaluation point for data, and where the data may be sent to a subsequent destination after evaluation. The end-point computer security facility 152 may be an application loaded onto the computer platform or computer support component, where the application may accommodate the plurality of computer platforms and/or functional requirements of the component. For instance, a client facility 144 computer may be one of a plurality of computer platforms, such as Windows, Macintosh, Linux, and the like, where the end-point computer security facility 152 may be adapted to the specific platform, while maintaining a uniform product and product services across platforms. Additionally, components may have different functions to serve within the enterprise facility's 102 networked computer-based infrastructure. For instance, computer support components provided as hubs 148, routers, server facility 142, DNS server facility 210, firewalls 138, and the like, may require unique security application software to protect their portion of the system infrastructure, while providing an element in an integrated threat management system that extends out beyond the threat management facility 100 to incorporate all computer resources under its protection.

The enterprise facility 102 may include a plurality of client facility 144 computing platforms on which the end-point computer security facility 152 is adapted. A client facility 144 computing platform may be a computer system that is able to access a service on another computer, such as a server facility 142, via a network. This client facility 144 server facility 142 model may apply to a plurality of networked applications, such as a client facility 144 connecting to an enterprise facility 102 application server facility 142, a web browser client facility 144 connecting to a web server facility 142, an e-mail client facility 144 retrieving e-mail from an internet 154 service provider's mail storage servers 142, and the like. In embodiments, traditional large client facility 144 applications may be switched to websites, which may increase the browser's role as a client facility 144. Clients 144 may be classified as a function of the extent to which they perform their own processing. For instance, client facilities 144 are sometimes classified as a fat client facility 144 or thin client facility 144. The fat client facility 144, also known as a thick client facility 144 or rich client facility 144, may be a client facility 144 that performs the bulk of data processing operations itself, and does not necessarily rely on the server facility 142. The fat client facility 144 may be most common in the form of a personal computer, where the personal computer may operate independent of any server facility 142. Programming environments for fat clients 144 may include Curl, Delphi, Droplets, Java, win32, X11, and the like. Thin clients 144 may offer minimal processing capabilities, for instance, the thin client facility 144 may primarily provide a graphical user interface provided by an application server facility 142, which may perform the bulk of any required data processing. Programming environments for thin clients 144 may include JavaScript/AJAX, ASP, JSP, Ruby on Rails, Python's Django, PHP, and the like. The client facility 144 may also be a mix of the two, such as processing data locally, but relying on a server facility 142 for data storage. As a result, this hybrid client facility 144 may provide benefits from both the fat client facility 144 type, such as multimedia support and high performance, and the thin client facility 144 type, such as high manageability and flexibility. In embodiments, the threat management facility 100, and associated end-point computer security facility 152, may provide seamless threat protection to the plurality of clients 144, and client facility 144 types, across the enterprise facility 102.

The enterprise facility 102 may include a plurality of server facility 142, such as application servers 142, communications servers 142, file servers 142, database servers 142, proxy servers 142, mail servers 142, fax servers 142, game servers 142, web servers 142, and the like. A server facility 142, which may also be referred to as a server facility 142 application, server facility 142 operating system, server facility 142 computer, or the like, may be an application program or operating system that accepts client facility 144 connections in order to service requests from clients 144. The server facility 142 application may run on the same computer as the client facility 144 using it, or the server facility 142 and the client facility 144 may be running on different computers and communicating across the network. Server facility 142 applications may be divided among server facility 142 computers, with the dividing depending upon the workload. For instance, under light load conditions all server facility 142 applications may run on a single computer and under heavy load conditions a single server facility 142 application may run on multiple computers. In embodiments, the threat management facility 100 may provide threat protection to server facilities 142 within the enterprise facility 102 as load conditions and application changes are made.

A server facility 142 may also be an appliance facility 140, where the appliance facility 140 provides specific services onto the network. Though the appliance facility 140 is a server facility 142 computer, that may be loaded with a server facility 142 operating system and server facility 142 application, the enterprise facility 102 user may not need to configure it, as the configuration may have been performed by a third party. In an embodiment, an enterprise facility 102 appliance may be a server facility 142 appliance that has been configured and adapted for use with the threat management facility 100, and located within the facilities of the enterprise facility 102. The enterprise facility's 102 threat management appliance may enable the enterprise facility 102 to administer an on-site local managed threat protection configuration, where the administration facility 134 may access the threat resources through an interface, such as a web portal. In an alternate embodiment, the enterprise facility 102 may be managed remotely from a third party, vendor, or the like, without an appliance facility 140 located within the enterprise facility 102. In this instance, the appliance functionality may be a shared hardware product between pluralities of enterprises 102. In embodiments, the appliance facility 140 may be located at the enterprise facility 102, where the enterprise facility 102 maintains a degree of control. In embodiments, a hosted service may be provided, where the appliance 140 may still be an on-site black box to the enterprise facility 102, physically placed there because of infrastructure requirements, but managed by a third party, vendor, or the like.

Simple server facility 142 appliances may also be utilized across the enterprise facility's 102 network infrastructure, such as switches, routers, wireless routers, hubs 148, gateways, print servers 142, net modems, and the like. These simple server facility appliances may not require configuration by the enterprise facility 102, but may require protection from threats via an end-point computer security facility 152. These appliances may provide interconnection services within the enterprise facility 102 network, and therefore may advance the spread of a threat if not properly protected.

One way for a client facility 144 to be protected from threats from within the enterprise facility 102 network may be a personal firewall. A personal firewall may be an application that controls network traffic to and from a client, permitting or denying communications based on a security policy. Personal firewalls may be designed for use by end-users, which may result in protection for only the computer on which it's installed. Personal firewalls may be able to control network traffic by providing prompts each time a connection is attempted and adapting security policy accordingly. Personal firewalls may also provide some level of intrusion detection, which may allow the software to terminate or block connectivity where it suspects an intrusion is being attempted. Other features that may be provided by a personal firewall may include alerts about outgoing connection attempts, control of program access to networks, hiding the client from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like. In embodiments, the personal firewall may be provided by the treat management facility 100.

Another important component that may be protected by an end-point computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a low level of trust is the Internet 154, because the source of data may be unknown. A zone with an intermediate trust level, situated between the Internet 154 and a trusted internal network, may be referred to as a "perimeter network". Since firewall facilities 138 represent boundaries between threat levels, the end-point computer security facility 152 associated with the firewall facility 138 may provide resources that may control the flow of threats at this enterprise facility 102 network entry point. Firewall facilities 138, and associated end-point computer security facility 152, may also be associated with a network node that may be equipped for interfacing between networks that use different protocols. In embodiments, the end-point computer security facility 152 may provide threat protection in a plurality of network infrastructure locations, such as at the enterprise facility 102 network entry point, i.e. the firewall facility 138 or gateway; at the server facility 142; at distribution points within the network, i.e. the routers and hubs 148; at the desktop of client facility 144 computers; and the like. In embodiments, the most effective location for threat detection may be at the user's computer desktop end-point computer security facility 152.

The interface between the threat management facility 100 and the enterprise facility 102, and through the appliance facility 140 to embedded end-point computer security facilities, may include a set of tools that may be the same for all enterprise implementations, but allow each enterprise to implement different controls. In embodiments, these controls may include both automatic actions and managed actions. Automatic actions may include downloads of the end-point computer security facility 152 to components of the enterprise facility 102, downloads of updates to existing end-point computer security facilities of the enterprise facility 102, uploaded network interaction requests from enterprise facility 102 components to the threat management facility 100, and the like. In embodiments, automatic interactions between the enterprise facility 102 and the threat management facility 100 may be configured by the threat management facility 100 and an administration facility 134 in the enterprise facility 102. The administration facility 134 may configure policy rules that determine interactions, such as developing rules for accessing applications, as in who is authorized and when applications may be used; establishing rules for ethical behavior and activities; rules governing the use of entertainment software such as games, or personal use software such as IM 162 and VoIP 164; rules for determining access to enterprise facility 102 computing resources, including authentication, levels of access, risk assessment, and usage history tracking; rules for when an action is not allowed, such as whether an action is completely deigned or just modified in its execution; and the like. The administration facility 134 may also establish license management, which in turn may further determine interactions associated with a licensed application. In embodiments, interactions between the threat management facility 100 and the enterprise facility 102 may provide threat protection to the enterprise facility 102 by managing the flow of network data into and out of the enterprise facility 102 through automatic actions that may be configured by the threat management facility 100 or the administration facility 134.

Client facilities 144 within the enterprise facility 102 may be connected to the enterprise facility 102 network by way of wired network facilities 148 or wireless network facilities 150. Client facilities 144 connected to the enterprise facility 102 network via a wired facility 148 or wireless facility 150 may receive similar protection, as both connection types are ultimately connected to the same enterprise facility 102 network, with the same end-point computer security facility 152, and the same threat protected enterprise facility 102 environment. Mobile wireless facility 150 clients 144, because of their ability to connect to any wireless 150 network access point, may connect to the internet 154 outside the enterprise facility 102, and therefore outside the threat-protected environment of the enterprise facility 102. In this instance the mobile client facility 144, if not for the presence of the end-point computer security facility 152 may experience a malware attack or perform actions counter to enterprise facility 102 established policies. In addition, there may be a plurality of ways for the threat management facility 100 to protect the out-of-enterprise facility 102 mobile client facility 144 that has an embedded end-point computer security facility 152, such as by providing URI filtering in personal routers, using a web appliance as a DNS proxy, or the like. Mobile client facilities 144 that are components of the enterprise facility 102 but temporarily outside connectivity with the enterprise facility 102 network, may be provided with the same threat protection and policy control as client facilities 144 inside the enterprise facility 102. In addition, mobile client facilities 144 may receive the same interactions to and from the threat management facility 100 as client facilities 144 inside the enterprise facility 102, where mobile client facilities 144 may be considered a virtual extension of the enterprise facility 102, receiving all the same services via their embedded end-point computer security facility 152.

Interactions between the threat management facility 100 and the components of the enterprise facility 102, including mobile client facility 144 extensions of the enterprise facility 102, may ultimately be connected through the internet 154. Threat management facility 100 downloads and upgrades to the enterprise facility 102 may be passed from the firewalled networks of the threat management facility 100 through to the end-point computer security facility 152 equipped components of the enterprise facility 102. In turn the end-point computer security facility 152 components of the enterprise facility 102 may upload policy and access requests back across the internet 154 and through to the threat management facility 100. The Internet 154 however, is also the path through which threats may be transmitted from their source. These network threats may include threats from a plurality of sources, including websites 158, e-mail 160, IM 162, VoIP 164, application software, and the like. These threats may attempt to attack a mobile enterprise facility 102 client facility 144 equipped with an end-point computer security facility 152, but in embodiments, as long as the mobile client facility 144 is embedded with an end-point computer security facility 152, as described above, threats may have no better success than if the mobile client facility 144 where inside the enterprise facility 102.

However, if the mobile client facility 144 where to attempt to connect into an unprotected connection point, such as at a secondary location 108 that is not a part of the enterprise facility 102, the mobile client facility 144 may be required to request network interactions through the threat management facility 100, where contacting the threat management facility 100 may be performed prior to any other network action. In embodiments, the client facility's 144 end-point computer security facility 152 may manage actions in unprotected network environments such as when the client facility 144 is in a secondary location 108 or connecting wirelessly 150 to a non-enterprise facility 102 wireless internet 154 connection, where the end-point computer security facility 152 may dictate what actions are allowed, blocked, modified, or the like. For instance, if the client facility's 144 end-point computer security facility 152 is unable to establish a secured connection to the threat management facility 100, the end-point computer security facility 152 may inform the user of such, and recommend that the connection not be made. In the instance when the user chooses to connect despite the recommendation, the end-point computer security facility 152 may perform specific actions during or after the unprotected connection is made, including running scans during the connection period, running scans after the connection is terminated, storing interactions for subsequent threat and policy evaluation, contacting the threat management facility 100 upon first instance of a secured connection for further actions and or scanning restricting access to network and local resources, or the like. In embodiments, the end-point computer security facility 152 may perform specific actions to remediate possible threat incursions or policy violations during or after the unprotected connection.

The secondary location 108 may have no end-point computer security facilities 152 as a part of its computer components, such as its firewalls 138, servers 142, clients 144, hubs 148, wireless hubs 150, and the like. As a result, the computer components of the secondary location 108 may be open to threat attacks, and become potential sources of threats, as well as any mobile enterprise facility 102 clients 144 that may be connected to the secondary location's 108 network. In this instance, these computer components may now unknowingly spread a threat to other components connected to the network.

Some threats may not come directly from the Internet 154, such as from non-enterprise facility 102 controlled mobile devices that are physically brought into the enterprise facility 102 and connected to the enterprise facility 102 client facilities 144. The connection may be made from direct connection with the enterprise facility's 102 client facility 144, such as through a USB port, or in physical proximity with the enterprise facility's 102 client facility 144 such that a wireless facility 150 connection can be established, such as through a Bluetooth connection. These physical proximity threats 110 may be another mobile computing device, a portable memory storage device, a mobile communications device, or the like, such as CDs and DVDs 170, memory stick 174, flash drive 174, external hard drive, cell phone 178, PDAs 180, MP3 players, digital cameras, point-to-point devices, or the like. A physical proximity threat 110 may have been previously infiltrated by network threats while connected to an unprotected network connection outside the enterprise facility 102, and when connected to the enterprise facility 102 client facility 144, pose a threat. Because of their mobile nature, physical proximity threats 110 may infiltrate computing resources in any location, such as being physically brought into the enterprise facility 102 site, connected to an enterprise facility 102 client facility 144 while that client facility 144 is mobile, plugged into an unprotected client facility 144 at a secondary location 108, and the like. A mobile device, once connected to an unprotected computer resource, may become a physical proximity threat 110. In embodiments, the end-point computer security facility 152 may provide enterprise facility 102 computing resources with threat protection against physical proximity threats 110, for instance, through scanning the device prior to allowing data transfers, through security validation certificates, through establishing a safe zone within the enterprise facility 102 computing resource to transfer data into for evaluation, and the like.

Now that the overall system has been described, we turn towards a set of network identification via domain name system (DNS) server embodiments. It should be understood that the following network identification via DNS server embodiments may be managed through a threat management facility 100 along with other services, such as those described herein.

Clients 144 may move amongst a plurality of locations, where each location may have a unique set of malware threats. One of these malware threats may be a network threat 104. For instance, and as shown in FIG. 1, the client 144A-C may be within the enterprise 102, where network threats 104 have been minimized due to layers of endpoint security facilities 152 in enterprise components related to the client 144A-C, such as in a firewall 138A, a server 142A, a DNS server 210A-B a hub 148A, a wireless hub 150A, and the like. Likewise, the client 144D-E may be outside the enterprise 102, where network threats 104 may only be minimized by the end-point security facility 152 in the client 144D-E, such as when the client 144F is exposed to secondary location threats 108, when the client 144D-E is connected to the Internet 154 in association with a DNS server 210C that is not associated with the enterprise, when the client 144D-F is connected to other network threats 104 outside the enterprise 102, or the like.

A client 144 may be able to increase the ease of use in computing, and the level of security from malware threats, if the client 144 could identify whether it was on a secure known network 208A-B or not. For instance, the client 144 could increase the ease of use in computing by allowing greater network access when the client 144A-C is connected to a known network 208A-B within the control of an enterprise administrator 134. Likewise, the client 144 could increase the level of security from network threats 104 by restricting network access when the client 144D-F is connected to networks 154, 208C not within the control of the administrator 134, such as when the client 144D-E is connected directly to the Internet 154, when the client 144F is connected to a secondary location threat 108, or the like. In addition, these changes in network access may be automatically prompted by policy management 112 as security characteristics for the network are identified. For example, if the client 144D-F connects to a new network 154, 208C that is not a known network 208A-B, policy management 112 may direct the client 144D-F to restrict network access in order to increase the level of security. In another example, the client 144A-C may connect to a network 208A-B that is identified as a known network 208A-B, and as a result may be directed through policy management 112 to increase network access. In embodiments, policy management 112 may include a plurality of rules associated with the location of a network they are connected to or if the network is known or unknown, such as security rules, usage rules, configuration rules, user rules, rules associated with groups of enterprise users, rules associated with subsidiary locations, rules associated with time zones, rules associated with time of day, and the like.

In embodiments, a client 144 may identify whether it is on a known network 208A-B, that is, a network 208A-B within the control of the administrator 134, through the use of DNS servers 210. One of the main functions of a DNS server 210 is to map domain names, such as www.example.com, into an IP address, such as 166.44.283.346. It is the IP address that is ultimately required for accessing content at the location specified by the domain name. However, the use of domain names may allow users to specify easy to remember mnemonic names for addresses on the Internet, rather than long numerical IP addresses. DNS servers 210 provide a lookup function that translates the user input domain name into the required IP address. These name and IP address pairs are supplied to the DNS server 210 by administrators 134 that control the domain name, and thus the administrator 134 may specify any name and IP address pair desired. These pairs are then typically registered and propagated through a DNS server 210 hierarchy throughout the Internet 154. However, the administrator 134 may also supply a secure name and secure IP address pair that is not registered, and is therefore only known to the DNS server 210 that represents an access point internal to the enterprise DNS server 210A-B within the control of the administrator 134. DNS servers 210C-D that are external to the enterprise, and not within the control of the administrator, are therefore not configured with secure name and secure IP addresses by the administrator, and may therefore not be able to match an incoming secure name to an IP address.

In embodiments, DNS servers 210A-B may be provided secure name and secure IP address pairs that uniquely identify them to clients 144A-C that are local to them. For example, an administrator 134 may supply a DNS server 210A-B with an unregistered secure name of 'lookup.soo.com' and a secure IP address of 127.0.0.2. Now if a client 144A-C requests the URI lookup.soo.com, the DNS server 210A-B will reply with the secure IP address 127.0.0.2. In embodiments, a domain name rather than an IP address may be used to identify DNS servers 210A-B and networks 208A-B local to them. In addition, there may be multiple secure name and secure IP address pairs, multiple secure names, multiple secure IP addresses, and the like, that may be used to identify DNS servers 210A-B and networks 208A-B local to them. In embodiments, the selection of the secure name may utilize a globally unique identifier (GUID), include a domain name, and the like. In addition, the globally unique name may be associated with a function, associated with an enterprise, resolve into a single unique secure IP address, not be available to hosts outside the enterprise, and the like.

In this way, the client 144A-C that has been provided with the secure name and secure IP address pairs from the administrator 134 may now identify that it is connected to one of these internally configured known DNS servers 210A-B. Conversely, when a client 144E-G sends out the secure name and receives nothing in return, the client 144D-F may interpret that it is not connected to a known DNS server 210A-B, and therefore to an unknown DNS server 210C-D and associated network 154, 208C. With this knowledge, the client 144, in conjunction with policy management 112, may be able to alter network access protocols in relation to known networks 208A-B verses unknown networks 154,208C.

Figure 2:
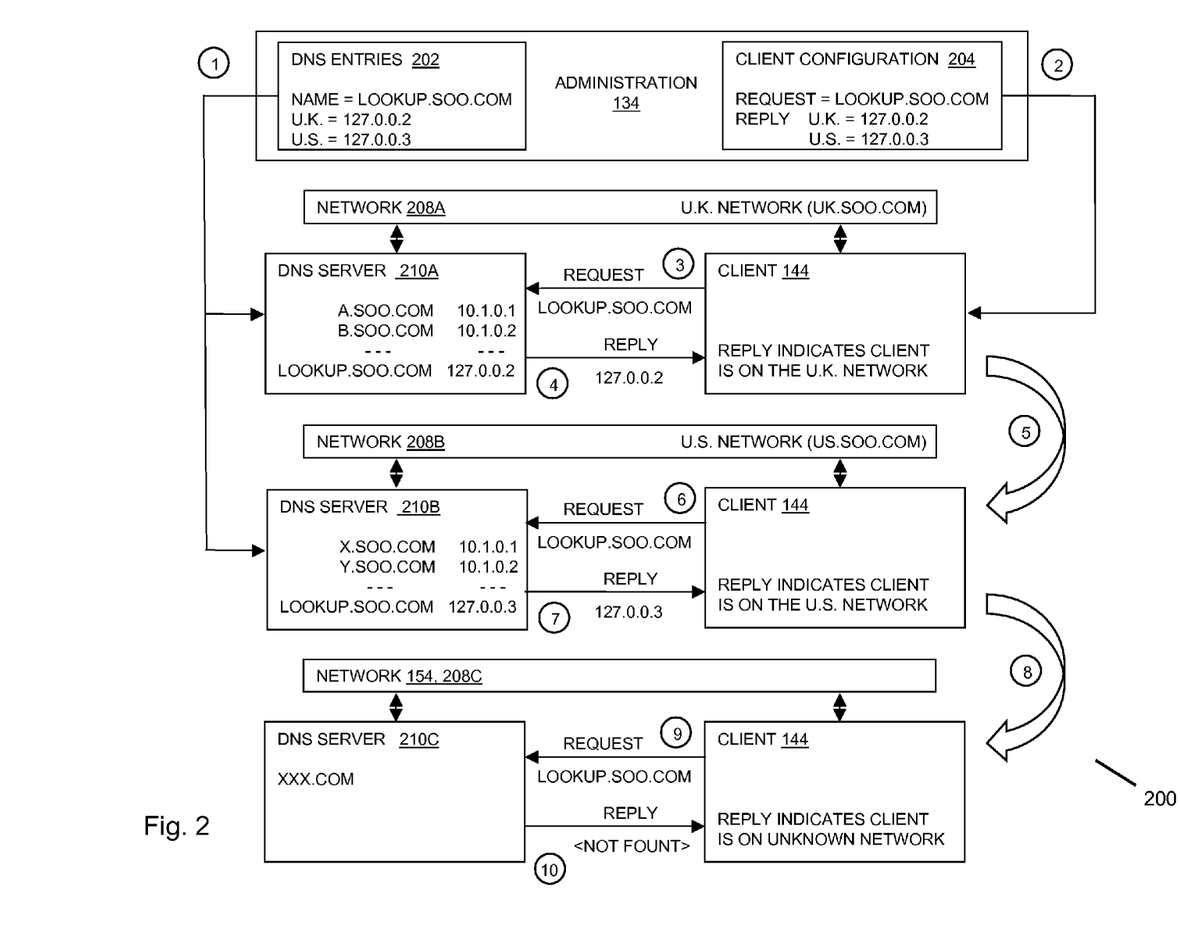
FIG. 2 shows a process flow embodiment for network identification through a domain name system (DNS) server.

FIG. 2 shows a process flow embodiment for network identification through a DNS server 210. To describe the process flow embodiment, reference will be made to FIG. 1, although it is understood that the process flow embodiment may be implemented in any other suitable environment or system. Further, the process flow embodiment is only an example and must not be taken in limiting sense.

At step 1 of the process, the administrator 134 may add DNS secure name and secure IP address entries 202 corresponding to an unregistered name, such as 'lookup.soo.com', to the internal access DNS servers 210A-B. The administrator 134 may be capable of adding DNS entries 202 corresponding to DNS servers 210A-B that are within administrator's 134 control, and thus, are known and secure networks 208A-B. For example, the administrator 134 may be able to add DNS entries 202 for the DNS servers 210A-B. Each DNS server 210A-B may get a unique secure IP address that uniquely identify them to the clients 144A-C local to them. In the case, as presented in FIG. 2, the UK network may be provided with the secure IP address of 127.0.0.2, and the US network may be provided with the secure IP address of 127.0.0.3, where the secure IP address may utilize a loopback IP address.

Following this, at step 2, the administrator 134 may configure the clients 144 in such a manner that the clients 144 may request the URI 'lookup.soo.com' when they are connecting to a new network 208. The new network 208 may be a Local Area Network (LAN), a Wide Area Network (WAN), a Metropolitan Area Network (MAN), or the like. In context of FIG. 2, the new network 208 may be a network 208A associated with U.K. network, a network 208B associated with U.S. network, a network 208C associated with a secondary location 108 or the Internet 154.

Now, because of the configurations made by the administrator 134, the clients 144 may request the URI 'lookup.soo.com' when connecting to the new network 208. Based on the request, the DNS sever 210A-B may reply with a secure IP address. The secure IP address obtained from the DNS server 210A-B may be matched to a table/configuration list of acceptable IP addresses. As a result of the matching, the clients 144 may know whether they are connected to a network 208A-B controlled by the administrator 134.

Now that the overall process flow has been described briefly, we turn towards a scenario, as shown in FIG. 2, in which a client 144 moves from the U.K. network 208A to the U.S. network 208B, and then directly onto the an unknown network 154, 208C, which may be any network not under the control of the administrator or directly onto the Internet 154. In this scenario, the U.K. network 208A and the U.S. network 208B are known networks.

At step 3, the client 144 may be connected to a new network, i.e. the U.K. network 208A. As the client 144 connects to the U.K. network 208A, it makes a request for the URI 'lookup.soo.com' to the DNS server 210A. Following this, the DNS server 210A replies with the IP address 127.0.0.2, i.e. the IP address associated with the U.K. network 208A. The client 144 compares the IP address reply with a configuration list. The configuration list contains a list of known networks as previously supplied by the administrator 134.

In this case, the IP address 127.0.0.2 denotes that the client 144 is connected to the U.K. network 208A, which is a known network. After obtaining this knowledge about the network, the client 144 may perform one or more actions. The actions may be to automatically trust a network, say the network 208A, examining internal policy rules for further direction, accessing external policy rules, and the like.

Now, when the client 144 moves from the U.K. network 208A to the U.S. network 208B at step 5, the client 144 again makes a request for the URI 'lookup.soo.com' to the DNS server 210A-B at step 6. In response to the request made at step 6, the DNS server 210A-B replies with the IP address 127.0.0.3 at step 7. The IP address reply indicates that the client 144 is now on the U.S. network 208B.

Going further, the client 144 may move from the U.S. network 208B to an unknown network, say the Internet 154 or some other network not within the control of the administrator, at step 8. As the client 144 connects to the network 154, 208C, it makes a request to the DNS server 210C at step 9. The request made by the client 144 at step 9 is similar to the requests made by the client 144 at steps 3 and 6. However, in this case, the DNS server 210C may not find a matching IP address for the URI 'lookup.soo.com' because the network 154, 208C is not a known network.

In such a scenario, the DNS server 210A-B may either send no reply to the request made by the client 144 or send an error message at step 10. In one embodiment, the DNS server 210A-B may reply with an IP address corresponding to some help facility. Further, the reply obtained from the DNS server 210A-B is compared with the configuration list.

The comparison of the reply with the configuration list suggests that the network 154, 208C is an unknown network, as no match for the reply is found in the configuration list. With this knowledge, the client 144, in conjunction with policy management 112, may be able to alter network access rules in relation to known verses unknown networks.

Figure 3:
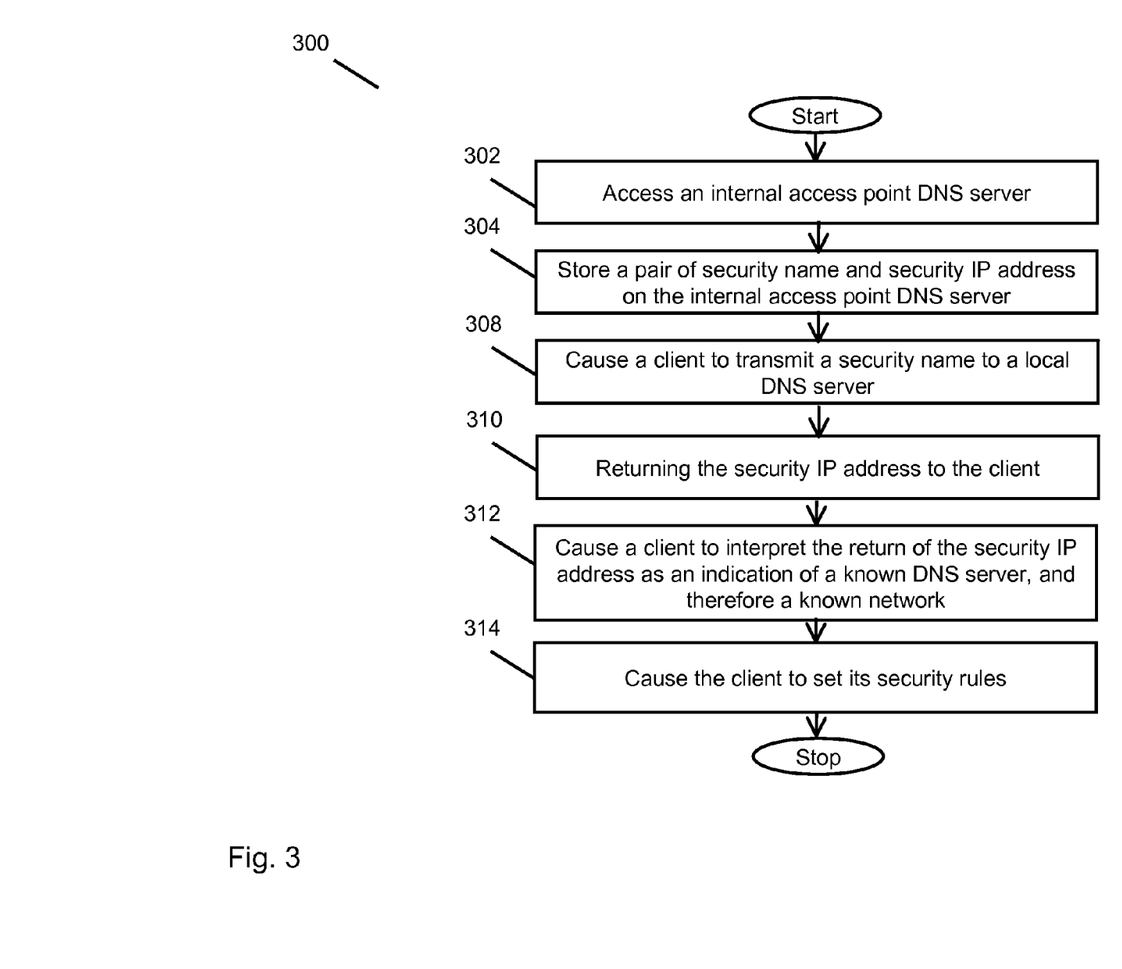
FIG. 3 depicts a logical process for network identification through a DNS server according to an embodiment of the present invention.

FIG. 3 depicts a logical process 300 for network identification through the DNS server 210 according to an embodiment of the present invention. The process 300 is shown to include various logical blocks. However, it should be noted that the process 300 may have all or fewer of the logical blocks shown in the FIG. 3. Further, those skilled in the art would appreciate that the logical process 300 can have a few more logical blocks in addition to the logical blocks depicted in the FIG. 3 without deviating from the scope of the invention. Further, while describing FIG. 3 references will be made to FIG. 1, although it is understood that the logical flow 300 may be implemented in any other suitable environment or system.

In embodiments, the DNS server 210A-B may be accessed at logical block 302. The DNS server 210A-B may be a DNS server 210 within the control of the administrator 134. Further, the DNS server 210A-B may be configured by the administrator 210. In one embodiment, while configuring the DNS server 210A-B, the administrator 134 may assign a security IP name and security address pair to the DNS server 210A-B. The security IP name and security address pair may be used as an identity for the DNS server 210A-B. For example, the administrator 134 may supply the server 210A-B with an unregistered name of 'xyz.abc.com' and an IP address of 127.0.0.X. Further, this name and IP address pair may be used to identify the DNS server 210A-B. In embodiments, the security IP name and security address pair assignment may be related to the networks associated with a DNS server and the client 144, such as having a common network between the DNS server and the client 144.

In embodiments, the administrator 134 may store a pair of name and IP address on the DNS server 210A-B at logical block 304. The administrator 134 may store the pair of name and IP address on a plurality of DNS servers 210A-B within their control, such as to all of the DNS servers 210A-B within their control, to DNS servers 210A-B that are to be identified, to DNS servers 210A-B that are associated with clients 144, to DNS servers 210A-B that are associated with a location, to DNS servers 210A-B that are associated with a function, and the like. In the embodiment illustrated in FIG. 3, the administrator 134 may provide a common name and IP address to all DNS servers 210A-B that are to be so configured. This represents only one possible embodiment of the invention, where in other embodiments a plurality of name and IP address pairs may be utilized. In embodiments, the name and IP address may not refer to a physical machine.

In embodiments, the client 144 may transmit a name to the DNS server 210 to request the DNS server 210 to lookup the IP address related to the client transmitted name at logical block 308. The client 144 may perform the transmission upon first connection to the network 208, first request on the network 208, when the client first boots up, when the client initializes the network 208, and the like. The name that the client 144 transmits may have been previously supplied by the administrator 134, such as when the administrator 134 was configuring name and IP addresses to a plurality of DNS servers 210A-B and clients 144 within their control. The client 144 may transmit the same name when the client 144 initiates a network connection, such as a network connection at a new geographical location, a network connection on which they have been connected before, an additional network connection to the client where the client has a plurality of network connections, and the like.

In embodiments, the DNS server 210A-B may return the IP address to the client 144A-C in response to the connection request at logical block 310. In the embodiment illustrated in FIG. 3, the DNS server 210A-B may have only one name and IP address pair recorded into the DNS server 210A-B by the administrator 134. This represents only one possible embodiment of the invention, where in other embodiments a plurality of name and IP address pair combinations may be utilized. In this embodiment though, the DNS server 210A-B may look up the name transmitted by the client 144A-C and find the matching IP address. The DNS server 210A-B may then return the IP address to the client 144A-C.

In embodiments, the client 144A-C may interpret the return of the IP address as an indication of a known DNS server 210A-B, and therefore a known network 208A-B at logical block 312. The client 144A-C may receive the returned IP address from the DNS server 210 and compare the IP address to the secure IP address previously stored in the client 144 by the administrator 134. If the client finds that the IP address returned from the DNS server 210 is a match, then the IP address is the IP address, and the client may interpret that it is connected to a known DNS server 208, across a known network 208A-B, where the known DNS server 210 and associated network is within the control of the administrator 134. If the client 144 finds that the IP address returned does not match the stored IP address, the client 144 may interpret that it is connected to an unknown DNS server 210C-D, across an unknown network 154, 208C, where the unknown DNS server 210C-D and associated network are not within the control of the administrator 134. The return of an IP address to the client 144 that is not the expected IP address may be the result of a DNS server 210 attempting to steer the client 144 to some website associated with a failure to match a name to an IP address, such as a help related website.

In embodiments, the client 144 may interpret a lack of return from the DNS server 210, or a return of an error message from the DNS server 210, as an indication that the client 144 is connected to an unknown network 208C-D. The lack of return, or the return of an error message, may be an indication that the DNS server 210 is not an internal access DNS server 210A-B, that is, a DNS server 210 under the control of the administrator 134, because the DNS server 210 was unable to match the client transmitted name to an IP address.

In embodiments, the client 144, as a result of interpreting that the client is on a known network 208A-B, may set its security rules according to known network rules at logical block 314 according to an administrator managed policy. The client 144, as a result of interpreting that the client 144 is on an unknown network 154,208C, may set its security rules according to unknown network rules. Security rules may include network access rules, such as associated with open access, restricted access, no access, and the like, where access may be related to a location of the client 144, a current location of the client 144, a previous location of the client 144, a home location of the client 144, and the like. In addition, the interpretation that the client 144 is connected to an unknown network 154, 208C may be to have the client 144 disconnect from the unknown network 154,208C.

In embodiments, the client 144, as a result of interpreting that the client is on a known network 208A-B, may take some action, such as acknowledging that the client 144 is on a known network 208A-B, look up a list of network parameters associated with the known network 208A-B, go to a network location on the known network 208A-B and retrieve information associated with operating on the known network 208A-B, go to a central location and retrieve information associated with operating on the known network 208A-B, and the like. For example, the client 144 may simply acknowledge that it is on a known network 208A-B and continue operating normally, as opposed to taking preventative measures in the case of not being on a known network 208A-B. The client 144 may have a list of attributes for various known networks 208A-B on the client 144, where the client 144 may go to this list of attributes for what could or should be done when connecting to the known network 208A-B. The client 144 may go to a location on the known network 208A-B, say a server 142A on the known network 208A-B, where information may be found instructing the client 144 as to what may be done on the known network 208A-B, what restrictions exist on the known network 208A-B, and the like. The client 144 may go to a central location on the internet 154, such as to a server 142A associated with the threat management facility 100, where information may be found instructing the client 144 as to what may be done on the known network 208A-B, what restrictions exist on the known network 208A-B, and the like. In embodiments, the client 144 may take this action as a part of policy, prior to accessing policy, to download policy, to update policy, and the like.

Figure 4:
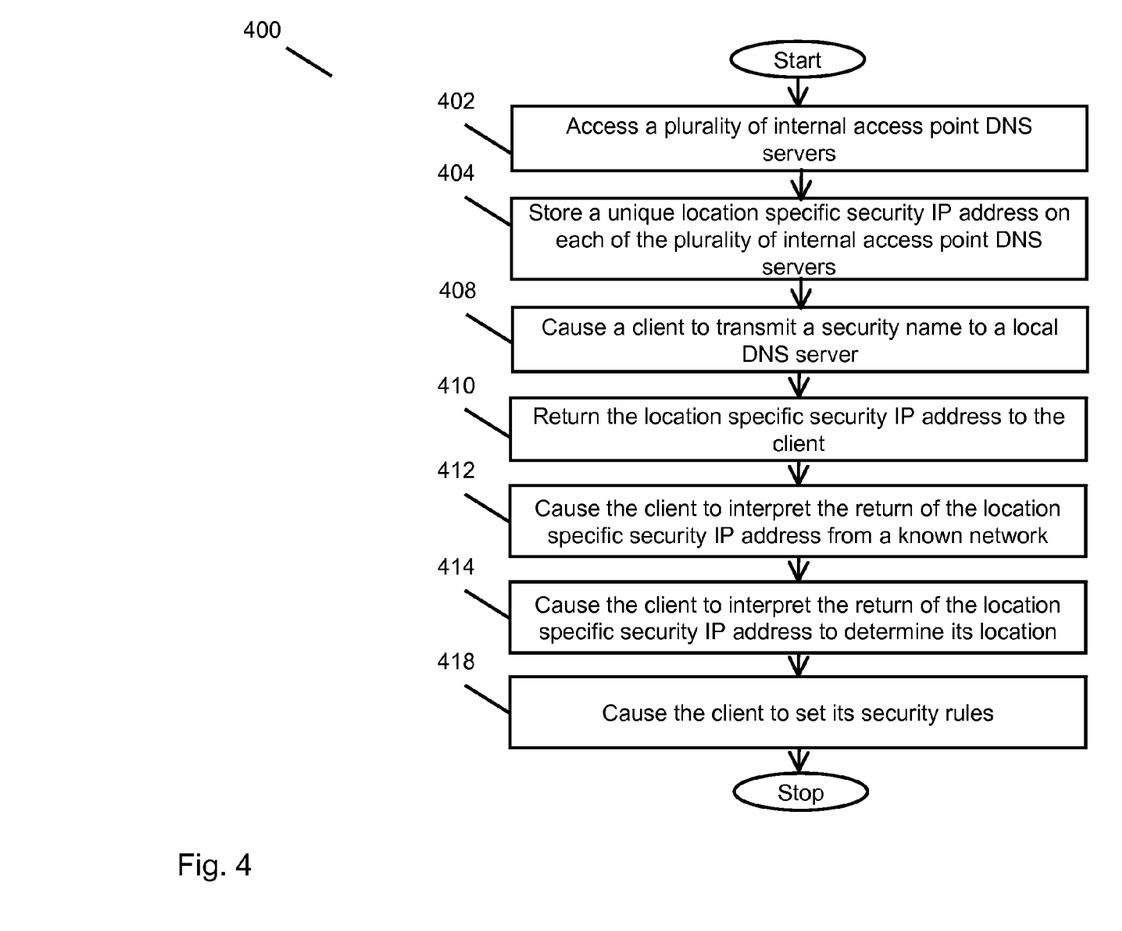
FIG. 4 depicts a logical process for network identification through a DNS server according to another embodiment of the present invention.

FIG. 4 depicts a logical process 400 for network identification through the DNS server 210 according to an embodiment of the present invention. The process 400 is shown to include various logical blocks. However, it should be noted that the process 400 may have all or fewer of the logical blocks shown in the FIG. 4. Further, those skilled in the art would appreciate that the logical process 400 can have a few more logical blocks in addition to the logical blocks depicted in the FIG. 4 without deviating from the scope of the invention. Further, while describing FIG. 4 references will be made to FIG. 1, although it is understood that the logical flow 400 may be implemented in any other suitable environment or system.

In embodiments, the plurality of DNS servers 210A-B may be accessed at logical block 402. The plurality of DNS servers 210A-B may include a DNS server 210 within the control of the administrator 134. Further, the plurality of DNS servers 210A-B may be configured by the administrator 210. In one embodiment, while configuring the DNS server 210A-B, the administrator 134 may assign a security IP name and security address pair to each of the DNS servers 210. The security IP name and security address pair may be used as a unique identity for each of the DNS servers 210A-B. For example, the administrator 134 may supply each server 210A-B with a common unregistered name of 'xyz.abc.com' for all the servers 210A-B, and a unique matched IP address to each DNS server 210A-B. Further, this common name and unique IP address pair may be used to identify the identity and location of the DNS server 210A-B. In embodiments, the security IP name and security address pair assignment may be related to the networks 208, and the location of the networks 208, associated with a DNS server 210 and the client 144, such as having a common network 208 between the DNS server 210 and the client 144.

In embodiments, the administrator 134 may store a unique location specific IP address on each of the plurality of DNS servers 210A-B at logical block 404, where all of the location specific IP addresses on the plurality of DNS servers 210A-B may have the same name. The administrator 134 may store the common name and unique IP addresses on the plurality of DNS servers 210A-B within their control, such as to all of the DNS servers 210A-B within their control, DNS servers 210A-B that are to be identified, DNS servers 210A-B that are associated with clients 144, DNS servers 210A-B that are associated with a location, DNS servers 210A-B that are associated with a function, and the like. This represents only one possible embodiment of the invention, where in other embodiments a plurality of name and IP address pairs may be utilized.

In embodiments, the client 144 may transmit a name to the DNS server 210 to request the DNS server 210 to lookup the IP address related to the client transmitted name at logical block 408. The client 144 may perform the transmission upon first connection to the network 208, first request on the network 208, when the client first boots up, when the client initializes the network 208, and the like. The name that the client 144 transmits may have been previously supplied by the administrator 134, such as when the administrator 134 was configuring name and IP addresses to a plurality of DNS servers 210A-B and clients 144 within their control. The client 144 may transmit the same name when the client 144 initiates a network connection, such as a network connection at a new geographical location, a network connection on which they have been connected before, an additional network connection to the client where the client has a plurality of network connections, and the like.

In embodiments, the DNS server 210 may return the IP address to the client 144 in response to the connection request at logical block 410. In the embodiment illustrated in FIG. 4, the DNS server 210 may have only one name and a plurality of IP address pairs recorded into the DNS server 210 by the administrator 134. This represents only one possible embodiment of the invention, where in other embodiments a plurality of name and IP address pair combinations may be utilized. In this embodiment though, the DNS server 210 may look up the name transmitted by the client 144 and find the matching IP address. The DNS server 208 may then return the IP address to the client 144.

In embodiments, the client 144 may interpret the return of the location specific IP address as an indication of a known DNS server 210, and therefore a known network 208A-B at logical block 412. The client 144 may receive the returned IP address from the DNS server 210 and compare the IP address to one of the secure IP addresses previously stored in the client 144 by the administrator 134. If the client finds that the IP address returned from the DNS server 210 is a match to one of the entries, then the IP address is the IP address, and the client may interpret that it is connected to a known DNS server 208, across a known network 208A-B, where the known DNS server 210 and associated network is within the control of the administrator 134. If the client 144 finds that the IP address returned does not match any of the stored IP addresses, the client 144 may interpret that it is connected to an unknown DNS server 210C, across an unknown network 154, 208C, where the unknown DNS server 210C and associated network are not within the control of the administrator 134. The return of an IP address to the client that is not the expected IP address may be the result of a DNS server 210 attempting to steer the client 144 to some website associated with a failure to match a name to an IP address, such as a help related website.

In embodiments, the client 144 may interpret a lack of return from the DNS server 210, or a return of an error message from the DNS server 210, as an indication that the client 144 is connected to an unknown network 208C. The lack of return, or the return of an error message, may be an indication that the DNS server 210 is not an internal access DNS server 210A-B, that is, a DNS server 210 under the control of the administrator 134, because the DNS server 210 was unable to match the client transmitted name to an IP address.

In embodiments, the client 144 may interpret the return of the location specific IP address to determine its location at logical block 414, where its location may be determined by matching the returned IP address to a table of secure IP addresses in the client. The table of secure IP addresses may have been created by the administrator 134, where each secure IP address may correspond to the location of the internal access DNS server 210A-B that it was assigned. The table may then have been sent to clients 144 that are under the control of the administrator 134. With this table, the client 144 may now determine not only that the network 208A-B is known, that is by receiving an IP address that is found in the table, but also the location of the known network 208A-B by matching the specific IP address to the corresponding location of the internal access DNS server 210A-B, and thus the location of the known network associated with the internal access DNS server. In embodiments, the location may be a country, a geographic region, a privately controlled location, a publicly controlled location, a business, an enterprise, a residence, a government facility, and the like.

In embodiments, the client 144, as a result of interpreting that the client is on a known network 208A-B, may set its security rules according to known network rules at logical block 418 according to an administrator managed policy. The client 144, as a result of interpreting that the client 144 is on an unknown network 154,208C, may set its security rules according to unknown network rules. Security rules may include network access rules, such as associated with open access, restricted access, no access, and the like, where access may be related to a location of the client 144, a current location of the client 144, a previous location of the client 144, a home location of the client 144, and the like. In addition, the interpretation that the client 144 is connected to an unknown network 154, 208C may be to have the client 144 disconnect from the unknown network 154,208C.

In embodiments, the communications between the client 144 and the DNS server 210 may be through secured transaction, such as the request made by the client 144 being an encrypted request and the DNS server 210 decrypting the request, the DNS server 210 sending an encrypted reply to the client 144 and the client 144 decrypting the request, encrypted communications between the administration 134 and the client 144, encrypted communications between the administration 134 and the DNS server 210, and the like. In embodiments, the need for secured transactions may be associated with the possible threat of a third party intercepting unsecured communications and deceiving the client into believing they are on a known network. In embodiments, the present invention may provide secure transactions between the client 144, DNS servers 210, and administration 134 to provide greater protection from threats 104,108,110,154.

In embodiments, the DNS server may be a domain name system security extension (DNSSEC) server. The DNSSEC server may provide secured transactions, such as through authentication of DNS data, data integrity, forged DNS data protection, digital signatures, authoritative DNS servers, cryptographic certificates, and the like. In embodiments, communications between the client 144 and the DNS server 210A-B may employ a DNSSEC server, use services provided by a DNSSEC server, combine encryption with a DNSSEC server, combine confidentiality services with a DNSSEC server, combine denial of service (DoS) with a DNSSEC server, and the like.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A method of operating a client to identify a private network, the method comprising:
    storing a pair of a name and an IP address on the client, wherein the IP address is assigned to the name by an administrator of a predetermined network;
    transmitting the name to a DNS server in a request for the DNS server to lookup a corresponding IP address;
    receiving a response to the request from the DNS server;
    comparing the request to the response, wherein a policy of the client is set for a known network when the corresponding IP address received from the DNS server matches the IP address stored on the client, and wherein the policy of the client is set for an unknown network when the DNS server does not return a matching IP address.

2. The method of claim 1 wherein the DNS server is an internal access point DNS server.

3. The method of claim 2 wherein the internal access point DNS server is within the control of the administrator.

4. The method of claim 1 wherein the policy is a security policy.

5. The method of claim 1 wherein the request made by the client is an encrypted request and the DNS server decrypts the request.

6. The method of claim 1 wherein the request made by the client is made through a secured transaction.

7. The method of claim 1 wherein the client uses the IP address to access information pertaining to the known network.

8. The method of claim 7 wherein the information pertaining to the known network is information relating to the location of the known network.

9. The method of claim 7 wherein the information pertaining to the known network is a set of information.

10. A system, comprising:
a DNS server, wherein a pair of a name and an IP address are stored in a memory on the DNS server, the name and the IP address specified by an administrator of a known network, the known network being a predetermined network associated with the DNS server;
a client, wherein the pair of the name and the IP address are stored in a client memory, the client configured to transmit to the DNS server a request to lookup a corresponding IP address for a requested name in the memory of the DNS server;
the memory of the DNS server returning the corresponding IP address to the client in response to the request;
the client interpreting the return of the corresponding IP address as an indication of a connection to the predetermined network when the corresponding IP address matches the IP address; and
the client setting a policy based on the connection to the predetermined network.

11. The system of claim 10 wherein the DNS server is an internal access point DNS server.

12. The system of claim 11 wherein the internal access point DNS server is within the control of the administrator.

13. The method of claim 10 wherein the policy is a security policy.

14. The system of claim 10 wherein the request made by the client is an encrypted request and the DNS server decrypts the request.

15. The system of claim 10 wherein the request made by the client is made through a secured transaction.

16. The system of claim 10 wherein the client uses the IP address to access information pertaining to the known network.

17. The system of claim 16 wherein the information pertaining to the known network is information relating to the location of the known network.

18. The system of claim 16 wherein the information pertaining to the known network is a set of information.

* * * * *